(12) United States Patent
Fox et al.

(10) Patent No.: US 6,934,908 B2
(45) Date of Patent: Aug. 23, 2005

(54) UNIFORM HANDLING OF EXTERNAL RESOURCES WITHIN STRUCTURED DOCUMENTS

(75) Inventors: James E. Fox, Apex, NC (US); Robert C. Leah, Cary, NC (US); Erich S. Magee, Morrisville, NC (US); John A. Scott, Lakeland, FL (US); Robert C. Sizemore, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 09/981,195

(22) Filed: Oct. 17, 2001

(65) Prior Publication Data

US 2003/0074481 A1 Apr. 17, 2003

(51) Int. Cl.[7] .............................................. G06F 17/21
(52) U.S. Cl. ..................................................... 715/513
(58) Field of Search ................. 715/511–516, 522–523, 715/530–531, 535–536; 717/136–143; 718/100; 719/316–332

(56) References Cited

U.S. PATENT DOCUMENTS

| | | | | |
|---|---|---|---|---|
| 5,283,887 A | * | 2/1994 | Zachery ...................... | 715/513 |
| 5,307,265 A | * | 4/1994 | Winans .......................... | 704/8 |
| 5,787,452 A | * | 7/1998 | McKenna .................. | 715/536 |
| 6,012,098 A | | 1/2000 | Bayeh et al. .............. | 709/246 |
| 6,073,143 A | * | 6/2000 | Nishikawa et al. ......... | 715/513 |
| 6,083,276 A | | 7/2000 | Davidson et al. .............. | 717/1 |
| 6,125,391 A | | 9/2000 | Meltzer et al. ............. | 709/223 |
| 6,151,624 A | | 11/2000 | Teare et al. .................. | 709/217 |
| 6,154,738 A | | 11/2000 | Call .............................. | 707/4 |
| 6,167,448 A | | 12/2000 | Hemphill et al. ........... | 709/224 |
| 6,182,092 B1 | | 1/2001 | Francis et al. .............. | 707/513 |
| 6,209,124 B1 | | 3/2001 | Vermeire et al. .............. | 717/1 |
| 6,212,640 B1 | | 4/2001 | Abdelnur et al. ........... | 713/201 |
| 6,226,675 B1 | | 5/2001 | Meltzer et al. ............. | 709/223 |
| 6,496,793 B1 | * | 12/2002 | Veditz et al. .................. | 704/8 |

OTHER PUBLICATIONS

INSPEC, JP2000250938A (abstract only).
INSPEC, C2000–09–7108–002 (Abstract only).
INSPEC, JP02000222275A (Abstract only).
INSPEC, JP411306205A (Abstract only).
INSPEC, WO200062143A1 (Abstract only).
INSPEC, C2001–06–7240–007 (Abstract only).

* cited by examiner

Primary Examiner—St. John Courtenay, III
Assistant Examiner—George Lawrence Opie
(74) Attorney, Agent, or Firm—Marcia L. Doubet

(57) ABSTRACT

Methods, systems, and computer program products for improving globalization of document content. A globalization model is defined which enables separating and externalizing translation-sensitive resources. A content translation expert can then operate efficiently to provide translated content, and a content designer can more easily focus on the task at hand using a resource-neutral document format. Using the disclosed techniques, translation-sensitive resources identified in a structured document can be programmatically translated by resolving references to a particular supplemental document in which the translated content for a target language has been specified.

23 Claims, 8 Drawing Sheets

FIG. 1A

```
sample.xml:

<sample>
  <!-- ************************************************************ -->
  <!-- Specify the translation languages that are supported.         -->
  <!-- ************************************************************ -->

<translationLanguages>
    <language default="true">english</language>
    <language>french</language>
  </translationLanguages>

<!-- ************************************************************ -->
  <!-- Specify data using translation keys.                          -->
  <!-- ************************************************************ -->

<panel1>
    <widget type="text" width="20"/>
    <widgetLabel translationKey="myWidgetLabel"/>
  </panel1>

<panel2>
    <fieldName translationKey="fieldNameForPanel2"/>
    <buttonLabel translationKey="labelForButtonInPanel2"/>
  </panel2>
</sample>
```

```
sample_english.xml:

<sample_english>
  <!-- ************************************************************ -->
  <!-- Specify the translated values for each element.  Note that   -->
  <!-- element tags match translation keys in the main document.    -->
  <!-- ************************************************************ -->
          141      144   142
  <myWidgetLabel>Label text</myWidgetLabel>
  <fieldNameForPanel2>Name<fieldNameForPanel2/>
143 <labelForButtonInPanel2>Help<labelForButtonInPanel2/>
         145                    146
</sample_english>
```

```
<panel1>
  <widget type="text" width="20"/>
  <widgetLabel>Label text</widgetLabel>
</panel1>
```

```
sample_french.xml:
<sample_french>
    <!-- ************************************************************ -->
    <!-- Specify the translated values for each element.  Note that  -->
    <!-- element tags match translation keys in the main document.  -->
    <!-- ************************************************************ -->
            174      172
    <myWidgetLabel>Texte etiquitte</myWidgetLabel> 171
    <fieldNameForPanel2>Nom<fieldNameForPanel2/> 173
    <labelForButtonInPanel2>Assiste<labelForButtonInPanel2/> 175
                                              176
</sample_french>
```

```
<panel1>
  <widget type="text" width="20"/>
  <widgetLabel>Texte etiquitte</widgetLabel>
</panel1>
```

UNIFORM HANDLING OF EXTERNAL RESOURCES WITHIN STRUCTURED DOCUMENTS

BACKGROUND OF THE INVENTION

1. Field of the Invention

The present invention relates to a computer system, and deals more particularly with translating identified information in structured documents into different languages.

2. Description of the Related Art

Companies have long recognized the desirability of "globalizing" or "internationalizing" computer software products. The globalization process is also sometimes known as providing "national language support" or "NLS". A formalized definition of globalization is that it combines processes known as "internationalization" and "localization". Internationalization is sometimes referred to as "NLS enablement", and localization is sometimes referred to "NLS implementation". Internationalization is the process of producing a product such that it is independent of any particular language, script, culture, and/or coded character set, and localization then adapts the internationalized product for a specific language, script, culture, and/or coded character set.

For example, if a software product displays menus to users, a globalized version of the product provides for translating the text (or at least some portion of the text) on the menus into the particular language preferred by the user. Similarly, software products that generate text messages for recording in an error log may be globalized such that the text messages will be recorded in a preferred language.

Early globalization efforts were focused on identifying and externalizing the text strings produced by a software product. That is, in order to translate the text strings into multiple languages efficiently, it was recognized that those strings should be not embedded inline within the code of the software product. Instead, tables (such as message tables) were defined to store the strings, and software products were written to use mnemonics or numeric identifiers which then could be used to index into the tables. Having the text strings externalized in this manner made translation easier, as a translator could simply substitute an appropriate version of each string in place within the table (or provide replacement tables in different languages), and the software would then access the translated text using the original mnemonic or numeric identifier.

Many of today's software products are written to produce and consume information which is represented using structured documents encoded in markup languages. Use of structured documents has also become increasingly prevalent in recent years as a means for exchanging information between computers in distributed networking environments. The Hypertext Markup Language, or "HTML", as one example, is a markup language which is widely used for encoding the content of structured documents which represent Web pages. The Web page content can be transmitted between computers of the public Internet for rendering to users, and may also be used for other purposes (and in other environments such as private intranets and extranets). The Extensible Markup Language, or "XML", is another markup language which has proven to be extremely popular for encoding structured documents. XML is very well suited for encoding document content covering a broad spectrum, not only for transmission between computers but also, in some cases, to enable automated processing of document content. XML has also been used as a foundation for many other derivative markup languages which are adapted for specialized use, such as VoiceXML, MathML, and so forth.

In view of the vast amount of content being encoded in structured documents today, and the increasing tendency to distribute such content throughout the world over distributed computing networks, techniques are needed for efficient and reliable globalization of content encoded in structured documents.

SUMMARY OF THE INVENTION

An object of the present invention is to provide efficient and reliable techniques for globalization of content encoded in structured documents.

Another object of the present invention is to provide techniques for efficiently and reliably translating identified information in structured documents into different languages.

It is another object of the present invention to provide globalization techniques which programmatically locate content to be translated, and which programmatically find the proper content to be used in a translated result.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, one aspect of the present invention provides methods, systems, and computer program products for translating identified information in structured documents. This aspect preferably comprises: programmatically locating content to be translated in a structured document; programmatically finding content to be used in a translated result of the structured document; and programmatically replacing the content to be translated with the content to be used, thereby created the translated result.

In this aspect, translation-sensitive content is preferably externalized from the structured document, and the content to be used is preferably encoded in one or more supplemental structured documents. In preferred embodiments, these supplemental structured documents contain language-specific translated content. The structured document preferably remains unchanged after the programmatic replacement. The translated result may be created dynamically while rendering to a user, or perhaps while rendering to a consuming component. The content to be translated and the content to be used may be text. They might include graphic images.

Preferably, the content to be translated is marked with a translation key, wherein the translation key is specified as an attribute name. The programmatically finding may further comprise matching an attribute value of the marked content to an element name in a supplemental structured document.

The technique preferably further comprises selecting a target translation language, wherein the content to be used is preferably encoded in a supplemental structured document and is preferably translated into the selected language. Optionally, the selecting may comprise programmatically determining a locale, and using the determined locale to select the target translation language.

The present invention will now be described with reference to the following drawings, in which like reference numbers denote the same element throughout.

BRIEF DESCRIPTION OF THE DRAWINGS

FIGS. 1A–1E illustrate a sample structured document which has been prepared for language translation, and two sample structured documents that may be used as input to the translation, according to embodiments of the present invention;

DESCRIPTION OF PREFERRED EMBODIMENTS

Figure 2:
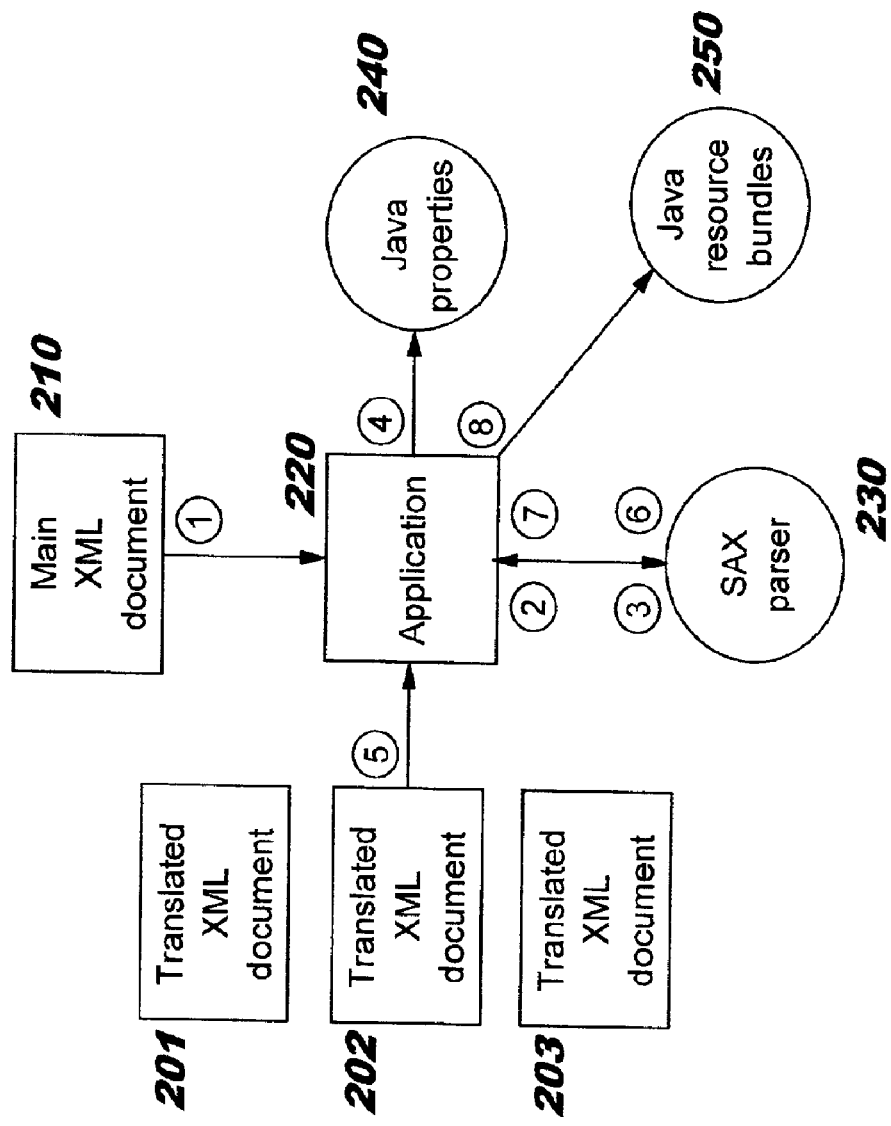
FIG. 2 depicts an overview of components and their interactions, according to one embodiment of the present invention.

Practitioners of the art who enable their structured documents for translation into different languages understand that existing prior art techniques are difficult and error-prone. Typically, prior art globalization processes comprise writing a document in a specific language, normally English, and then handing the document to a translation team. The translators then produce documents in other languages by copying the original to create a new document wherein each element identified by the translation team as translatable has been manually replaced with the appropriate translated element. This process can also be very time-consuming and tedious. In addition, there is no standard technique known to the inventors for localizing structured document content (i.e. for adapting structured document content to one or more different languages). The present invention addresses these issues, and discloses novel techniques for efficiently and reliably translating content encoded in structured documents using programmatic techniques.

A globalization model is disclosed herein, whereby translation-sensitive resources (such as text strings) are isolated or externalized from the main structured document, and these resources are then localized using a set of language-specific "supplemental" documents which contain translated versions of the resources. When using this model, a content designer preferably prepares the main structured document, and one or more supplemental documents are preferably prepared by language translation experts. The techniques disclosed herein resolve the translation programmatically.

The model disclosed herein enables use of a uniform approach to globalization, allowing the main structured document to remain unchanged in response to translation, and to be expressed in a resource-neutral format. In this manner, translations may be performed with little or no impact on the original structured document.

The techniques of the present invention may be used advantageously for content that is designed for many different types of scenarios. As one example, a complex software product may have a number of graphical user interface ("GUI") windows to display to users, each of which contains various titles, menu bar text, field labels, button labels, and so forth. A significant amount of help text and a large number of textual messages may also be provided with the software product. As another example, a software installation package which installs software may itself have a considerable amount of GUI information, help text, and messages. In order to facilitate use of such products by end users, information rendered to the user is preferably translated into his or her preferred language, as stated earlier. It should be noted, however, that the present invention is not limited to end-user scenarios: instead, translated content created according to the present invention may be used as input to another programmatic component. The term "consumer" is used herein to encompass any type of component which receives the translated content created by the present invention, and includes (by way of illustration) rendering engines, automated processes which operate on structured content, and also storing translated content in a repository.

An example scenario is described herein to illustrate operation of the present invention. This example is based on structured documents encoded in XML, and the descriptions herein are in terms of documents encoded using XML, although this is for purposes of illustration and not of limitation. Many other markup languages might be used alternatively. Furthermore, while preferred embodiments are described with reference to translations of textual elements, it will be obvious to one of skill in the art that the present invention is not limited to use with translation of text: the disclosed techniques may be adapted for use with other types of elements in a straightforward manner, once the teachings of the present invention are known. (For example, rather than identifying a textual element that is to be resolved in a language-specific manner, the techniques of the present invention may also or alternatively be used to identify a choice of culture-specific icons or graphic images. Such adaptations are further discussed below at an appropriate location.)

In preferred embodiments, the present invention is implemented in software, although alternative embodiments may use a combination of software and hardware. Discussions hereinafter are in terms of a software implementation. The software is preferably implemented using an object-oriented programming language such as the Java™ programming language. ("Java" is a trademark of Sun Microsystems, Inc.) Alternatively, the software may be implemented in other programming languages, including conventional procedural languages.

An implementation of the present invention may be executing in a distributed computing network, such as the Internet. For example, the programmatic translation process may be performed on a Web server, while preparing to serve content to requesters across a communications medium. Or, an implementation of the present invention may be executing in a stand-alone environment, for example on a device which is preparing translated content to be stored for subsequent use (including subsequent serving to a requester). It should also be noted that requesters of translated content are not necessarily end users, but may alternatively be other executing programs or software components. The devices on which an implementation of the present invention may operate include end-user workstations, mainframes or servers, or any other type of device having computing or processing capabilities capable of performing the operations discussed herein (or their functional equivalents). These devices, and the distributed computing networks in which they may optionally be executing, are well known to those of skill in the art, and a description thereof is not deemed necessary to an understanding of the present invention.

Preferred embodiments of the present invention will now be discussed in more detail with reference to FIGS. 1 through 5.

FIGS. 1A through 1E illustrate the globalization model used by the present invention. In FIG. 1A, an example "main" document 100 is shown which, for purposes of discussion, presumably defines content for two panels "panel1" and "panel2" to be displayed using GUI windows. (See elements 120 and 130.) In this example, panel1 120 includes a widget, and this widget has a label. (See elements 121 and 122.) Panel2 has a field with a name, as well as a button which has a label. (See elements 131 and 134.) Note, however, that the actual label and field name content is not specified in this main document. Instead, this content has been externalized and, in this example, has been provided in translated form as English language supplemental document 140 (see FIG. 1B) and French language supplemental document 170 (see FIG. 1D). As will be obvious, many more supplemental documents might be provided which contain the externalized content as translated into many other languages.

In preferred embodiments, the main document 100 explicitly identifies the languages for which translated content is available. In the example of FIG. 1A, a "<translationLanguages>" element 110 is used for defining this information. As shown therein, an optional feature of the present invention is to define a particular one of the languages (and therefore of the supplemental documents) as being a default. This default may be used when translated content is not found for a particular resource (as will be discussed with reference to the flowcharts). Use of the <translationLanguages> element enables programmatically determining the identification of the appropriate supplemental document. (The term "appropriate" supplemental document refers to the supplemental document for the language into which content is being translated.) In alternative embodiments, the <translationLanguages> element may be omitted, and the linkage between the main document and the appropriate supplemental document may be established in other ways which will be obvious to one of skill in the art (for example, by asking a human to specify a file name in which the supplemental document is stored).

Preferred embodiments use a specially-denoted attribute as a translation trigger or key. A content designer using the globalization model of the present invention specifies this translation key as an attribute name for each element to be translated. Preferably, a single such attribute name is used within a single main document, although in alternative embodiments, more than one translation key might be used. In the example main document 100, the translation key is "translationKey", as shown at 123, 132, and 135. An implementation of the present invention which processes document 100 is preferably written to expect this attribute name as the translation key. In alternative embodiments, a subelement might be specified in the <translationLanguages> element 110 to dynamically specify the attribute name which is to signify the translation key. For example, such a subelement might be encoded as <triggerName>translationKey</triggerName>

Use of the translation key enables linking the translatable resources of the main document to the translated content provided in the supplemental documents, and thereby enables resolving the translation to provide a resulting document which may be rendered to a user or provided to a requester, or which may simply be stored for some subsequent use. The example documents in FIGS. 1A–1E illustrate how this resolution process occurs, as will now be described.

According to preferred embodiments of the globalization model disclosed herein, when the content designer specifies the translation key as an attribute name on the element for a translatable resource, he or she also specifies an attribute value which is associated with that resource. This attribute value is then used to programmatically scan the appropriate supplemental document to find the translated content which is to be rendered for this element. For example, the special translation key "translationKey" appears as an attribute name 123 for the "widgetLabel" element 122 of FIG. 1, and this attribute's value is "myWidgetLabel" 124.

Continuing with the example, suppose that main document 100 is to be rendered in English. By consulting the supplemental document which, for this example, is named "sample_english" and is shown as element 140 in FIG. 1B, it can be seen that attribute value 124 appears as a tag name at 141. This tag 141 has a value, which in the example is "Label text" 142. According to the present invention, the linkage provided in this manner indicates that value 142 is to be used for the value of the widgetLabel tag 122 in FIG. 1A. FIG. 1C shows a document fragment 150 in which this programmatic resolution has occurred, yielding an English-language version of the panel1 tag 120 of FIG. 1A.

If, on the other hand, document 100 is to be translated into French, then attribute value 124 is used to scan the supplemental document which is named "sample_french", shown as element 170 in FIG. 1D. The tag at 171 uses this attribute value 124 as its tag name, and has a value of "Texte etiquitte" 172. Thus, the French-language version of the panel1 tag 120 of FIG. 1A is as shown in document fragment 180 of FIG. 1E.

In the same manner, it can be seen how the translated content for the fieldName element 131 and the buttonLabel element 134 of FIG. 1A—which is expressed as "Name" and "Help" in the English supplemental document 140 (see 143 and 145 of FIG. 1B) and as "Nom" and "Assiste" in the French supplement document 170 (see 173 and 175 of FIG. 1D)=can be located using the specified attribute values at 133 and 136, and it will be readily understood how the corresponding <panel2> element appears after programmatic resolution has occurred. The translated content is shown at 144 and 146 of FIG. 1B, and at 174 and 176 of FIG. 1D.

Turning now to FIG. 2, a diagram is provided which depicts an overview of components and their interactions, according to one embodiment of the present invention. This diagram is generally representative of an embodiment wherein the Java programming language is used to implement the present invention, and wherein the documents resulting from resolution of translation references may be created as Java resource bundles. As shown in FIG. 2, a main XML document 210 is processed by an application 220, as denoted by encircled numeral 1. Application 220 may be any type of software component which consumes structured documents (that is, which uses structured documents as input) and which has been augmented to include the functionality of the present invention; or, an application may invoke features of the present invention which have been implemented as a globalization utility. (Both scenarios are described hereinafter with reference to the application controlling the resolution process, for ease of reference.) To parse this input document 210, application 220 instantiates a parser and invokes the services of this instance, which in this embodiment is preferably a SAX parser 230. This invocation is represented by encircled numeral 2. "SAX" refers to a commercially-available event-based application programming interface ("API"), and is an abbreviation for "Simple API for XML". (More information on the SAX API may be found at http://megginson.com/SAX/SAX1/javadoc/packages.html and http://www.megginson.com/SAX/sax.html.)

The SAX parser 230 parses the main XML document 210, as denoted by encircled numeral 3, and signals events that pass data back to application 220. Upon receipt thereof, application 220 registers the received data in a local properties object 240, using the translation key's attribute value (see element 124 of FIG. 1A, for example). This registration is denoted by encircled numeral 4. At the conclusion of parsing the main XML document 210, one or more supplemental documents shown in FIG. 2 as 201, 202, 203 are passed to the application 220 (as denoted by encircled numeral 5). Application 220 then instantiates a new SAX parser instance (shown as parser 230 in FIG. 2) to parse these supplemental documents. Encircled numeral 6 represents this instantiation.

According to the globalization model of the present invention, application 220 then matches data received from the supplemental documents during the parsing process to the previously-stored information in properties object 240, matching up attribute values from the main document to element names in the supplemental documents as described with reference to FIGS. 1A–1E. This process is represented generally by encircled numeral 7. Finally, the data from properties object 240 is written out (as shown by encircled number 8) to language-specific Java resource bundles 250 for subsequent consumption.

In an optional aspect of the present invention, programmatic techniques may be used in a Java language implementation of the present invention to obtain the locale of the device on which the process depicted in FIG. 2 is operating. This locale information may then be appended to a text string to construct a Java class file name in order to determine which of the supplemental files to use for a particular case. A locale object created for use with Java programs typically specifies a 2-character language code and a 2-character country code. For example, the characters "fr" and "CA" designate the French language and the country of Canada. A French Canadian supplemental document for use with the "sample.xml" document 100 of FIG. 1A might therefore be named "sample_fr_CA.xml". Use of such a supplement document for translation would be appropriate for an end user having the "fr", "CA" locale. It will be obvious to one of skill in the art how the locale information can therefore be used to identify a particular one of the supplemental files.

Figure 3A:
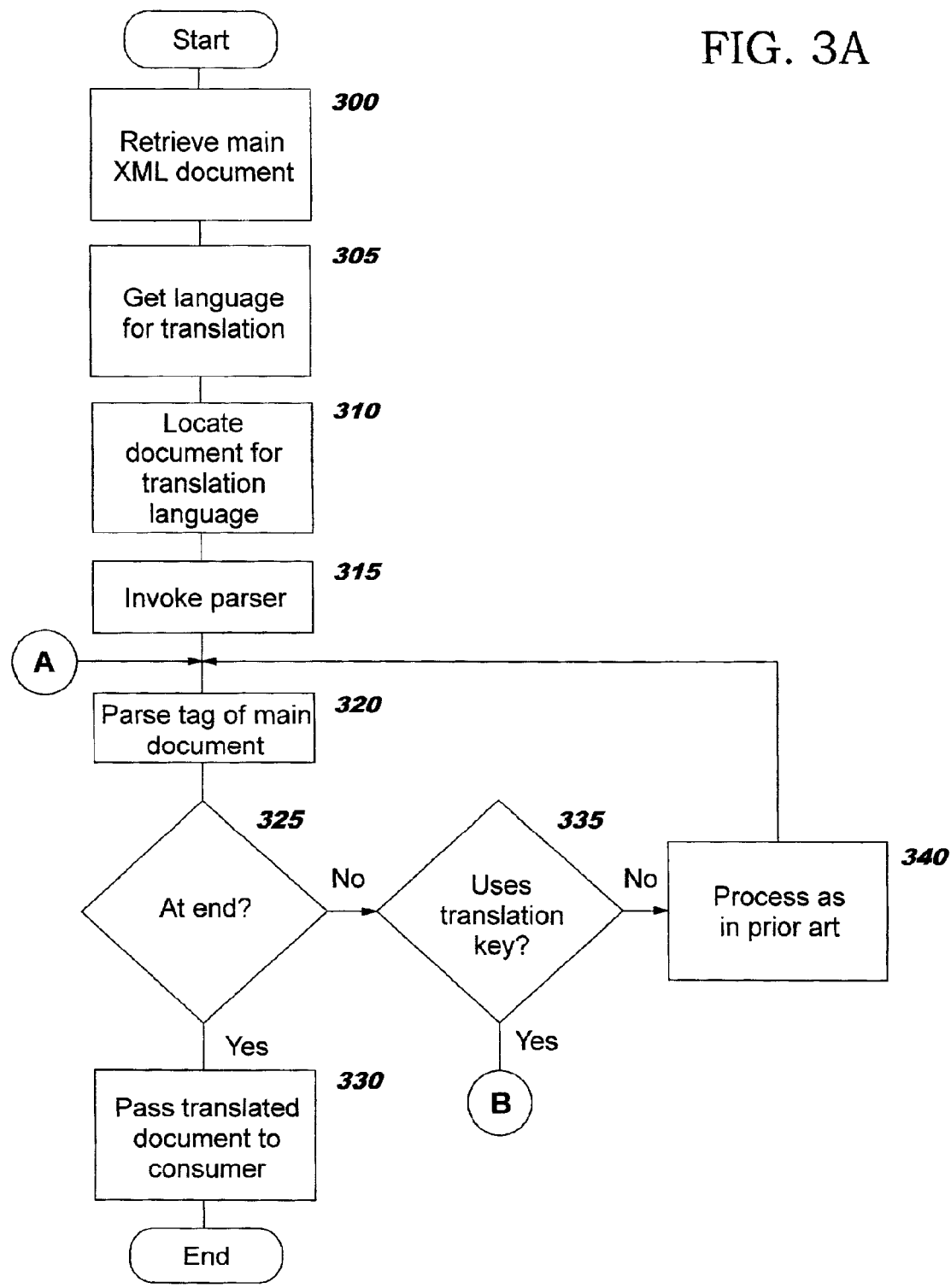
FIGS. 3A and 3B provide flowcharts depicting logic which may be used to implement an embodiment of the present invention.
Figure 3B:
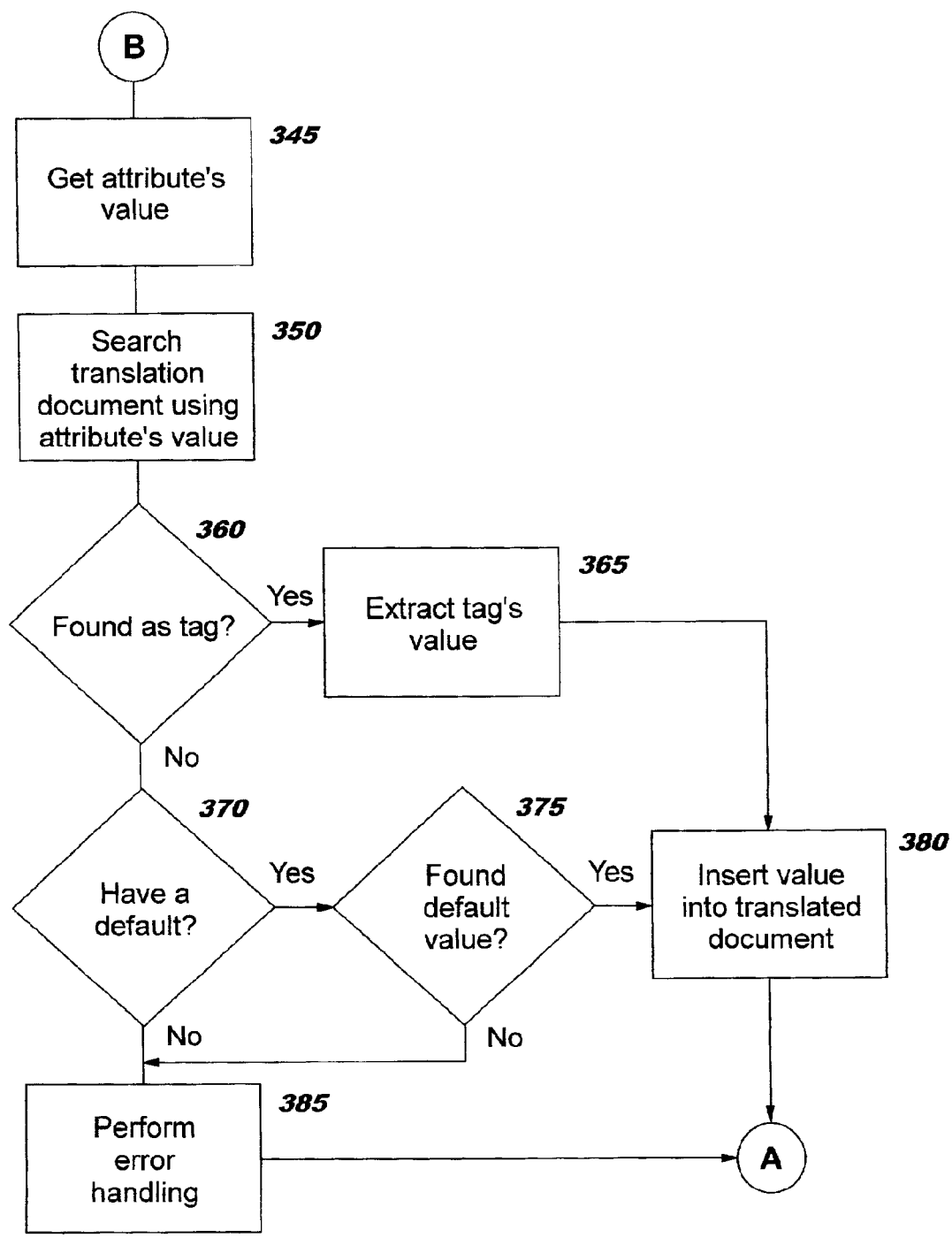

The flowcharts in FIGS. 3A and 3B depict logic which may be used to implement an embodiment of the present invention. In this embodiment, a new document is created as a main document is parsed, where the new document contains content translated into a particular language (using translation content specified in a particular one of the supplemental documents corresponding to the main document). This process begins in Block 300, which retrieves the main document (such as document 100 in FIG. 1A) for which a translated version is being created. Block 305 then obtains an identification of the language of the translation. This identification may be obtained in a number of ways. As one example, a human user may be queried to provide a response, and (if desired) the selections presented to this user may be taken from the main document (by consulting a list which has been provided as shown at 110 of FIG. 1A, for example). As another example, the locale of the device on which the implementation is executing may be programmatically determined, as explained above. The supplemental document corresponding to the selected translation language is then located (Block 310). (For example, document 140 of FIG. 1B or document 170 of FIG. 1C might be located.)

Block 315 invokes a parser to operate on the structured documents. Block 320 then begins an iterative process that scans the markup language tags of the main document. Block 325 checks to see if this scanning process has reached the end of the main document. If so, then the new document which has been created according to the processing of FIGS. 3A and 3B may be passed to a consumer such as a rendering engine (Block 330), and the processing shown in these figures then ends. (Alternatively, if the document is not being rendered, then it may simply be stored or may be passed as input to a software component which is designed to operate on its content.)

When the test in Block 325 has a negative result, the parsing of the main document is not yet complete and thus processing continues at Block 335 which checks to see if the just-parsed markup language element contains the translation key (i.e. as an attribute, as described above with reference to 123 of FIG. 1A). If it does not, then processing of this element occurs as in the prior art (Block 340), after which control returns to Block 320 to parse another element of the main document. Otherwise, when the translation key has been located, then processing continues as shown in FIG. 3B.

In FIG. 3B, the attribute value for the located translation key is obtained (Block 345), and is used to search the supplemental document (Block 350) to locate that value. (Refer to the discussion of resolving references 124, 141, above, for example.) Block 360 tests to see if the attribute value was located as a markup language tag in the supplemental document. If so, then Block 365 extracts the value of that tag. (This corresponds to extracting the text at 142 in FIG. 1B, for example.) Otherwise, if the attribute value is not found, then in optional processing, a default value may be located and used in the new document. Thus, Block 370 checks to see if there is a default language, and if so, Block 375 finds the default value. Suppose, for example, that a translation into French is being performed using documents 100 and 170 of FIGS. 1A and 1D, but that tag 173 was omitted for some reason. To resolve the "fieldNameFor-Panel2" reference 133, Block 360 will have a negative result. However, if English has been specified as the default language, as shown at 110 of FIG. 1A, then this negative result triggers a scan of the English language supplemental document 140 of FIG. 1B, where this string value may be found on a markup language tag (see 143). Thus, the default content value "Name" 144 will be used in this case. On the other hand, if default processing is not supported, or if the default supplemental document also fails to resolve the reference, then error handling may be performed (Block 385). As one example, this error handling may comprise inserting a hard-coded text string such as "unknown" or "unresolved" in place of the expected translated content.

When the translated content has been successfully located (i.e. after the processing of Block 365 and after a positive result in Block 375), Block 380 inserts that value into the new document being created. Subsequently, control returns to Block 320 of FIG. 3A to continue parsing the main document. Similarly, the parsing process preferably resumes at Block 320 after the error handling of Block 385.

In this manner, a new document containing translated content is programmatically constructed. The documents which are input to this process provide a clean delineation of translated content, according to the globalization model provided by the present invention. This approach is efficient and reliable, and provides scalability for a virtually unlimited number of languages.

Note that if it is desired to use the teachings of the present invention for substituting objects other than translated text, such as was described earlier with reference to different images that may be appropriate for different cultures, then the approach used in FIG. 1A may remain unchanged, and the localized content in the supplemental documents may provide (for example) a file name or Uniform Resource Locator ("URL") identifying the stored image as the value of the element which is linked to the main document. That is, <myWidgetLabel>Label text</myWidgetLabel> might be replaced with

<myWidgetLabel>http://myWidgetIcon.jpg</myWidgetLabel>.

Thus, the techniques of the present invention are easily adaptable to globalization of many types of content.

Figure 4:
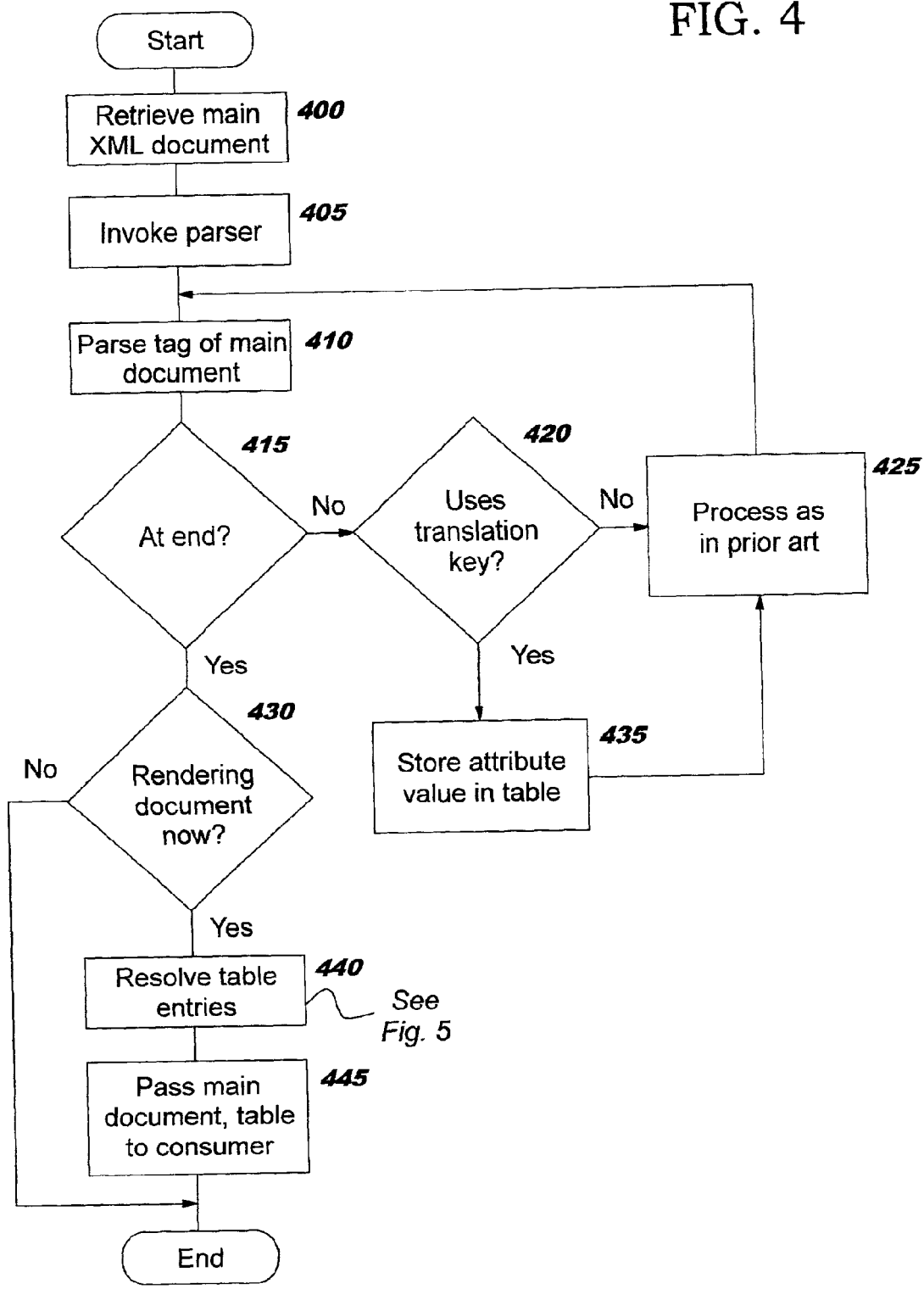
FIGS. 4 and 5 provide flowcharts depicting logic which may be used to implement another embodiment of the present invention.
Figure 5:
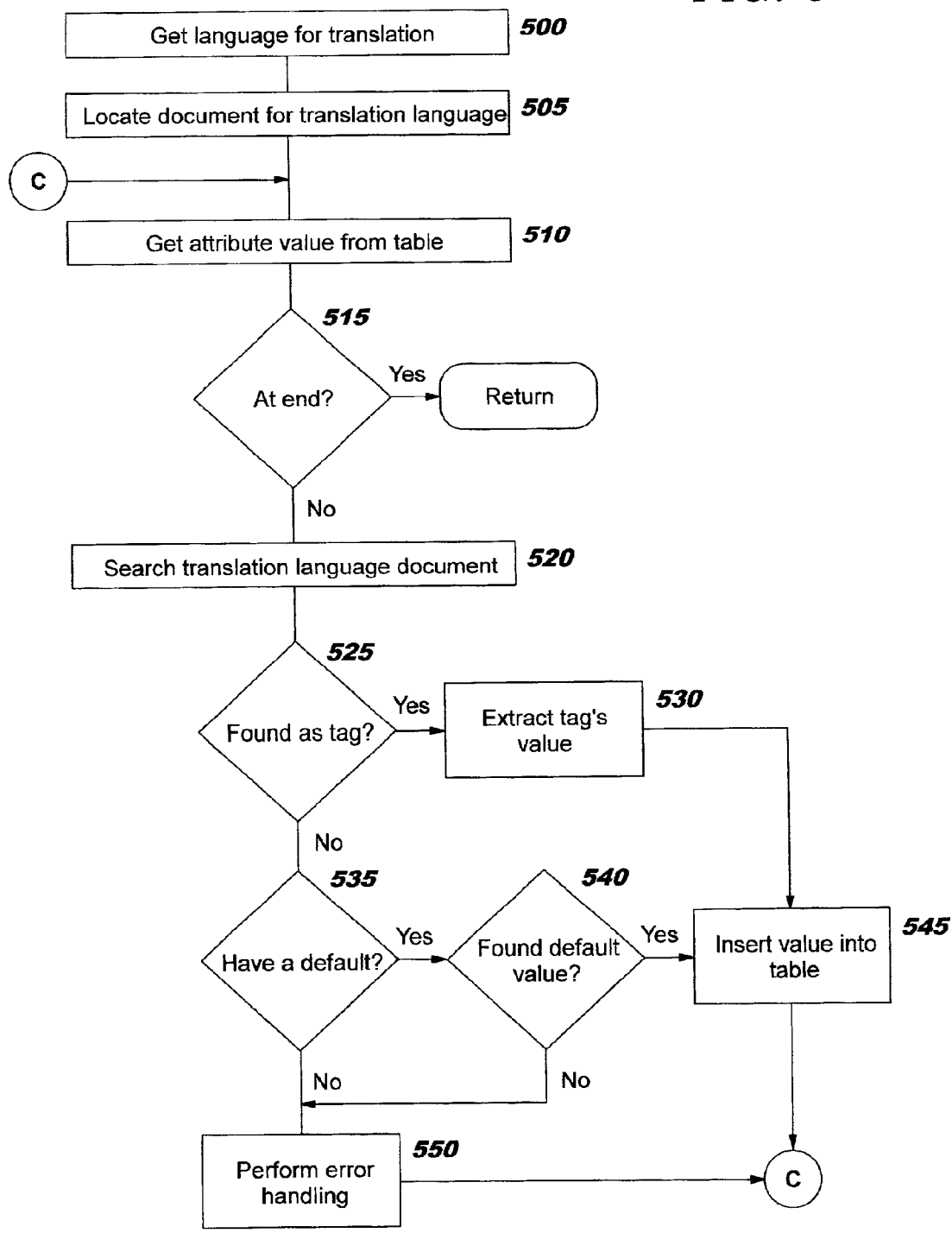

FIGS. 4 and 5 provide flowcharts depicting logic which may be used to implement another embodiment of the present invention. In this embodiment, rather than creating a new translated document element-by-element as in the approach of FIGS. 3A and 3B, references to the translation key in the main document are gathered and stored into a repository which is described herein as a table. Once all the translation key references have been gathered, they may be resolved—or the resolution may be deferred until another time. This latter approach may be particularly advantageous in scenarios where it is desirable to create multiple different translations of one main document, effectively treating the various supplemental documents as plug-ins to the main document via the table that has been created. FIG. 4 describes creation of the table, and FIG. 5 describes the resolution of the translation references using such a table.

The processing of FIG. 4 is similar to that of FIG. 3A, except that the parsing process (Block 405) may begin immediately after retrieving the main document (Block 400). That is, it is not necessary to determine a target translation language nor to locate the supplemental files at this time. During the parsing process, Block 410, 415, 420, and 425 preferably operate in the same manner as Blocks 320, 325, 335, and 340 of FIG. 3, respectively. A difference is in the positive result processing for Block 420, after locating a translation key reference in the main document. As has been stated above, this embodiment creates a table or other repository of such references, and this is reflected in Block 435. After creating the table entry, Block 425 may perform other processing of the markup language element using prior art techniques.

Once the parsing process is complete, as indicated by a positive result for the test in Block 415, control reaches Block 430 which checks to see if the translated document is to be rendered now. If not, then the processing of FIG. 4 ends. Otherwise, the table entries are resolved (Block 440), and the main document and resolved table are passed to a consumer such as a rendering engine (Block 445), which consumes/renders the translated document. The table resolution of Block 440 is further described in FIG. 5.

The processing of FIG. 5 is similar to that of FIG. 3B, but begins by determining which is the target translation language (Block 500) and then locating the corresponding supplemental document (Block 505). An additional difference is that this processing iterates for each entry in the table created in FIG. 4, and thus Block 510 retrieves an attribute value from that table. For example, for document 100 of FIG. 1A, the processing of FIG. 4 will have created a table containing entries for attribute values 124, 133, and 136. Block 510 iteratively retrieves each of these attribute values. Upon reaching the end of the table, as indicated by Block 515, control returns to the mainline processing of the invoking program (such as Block 440 of FIG. 4).

Otherwise, Block 520 searches the supplemental document identified in Block 505, attempting to find this attribute value specified as a markup language tag. The processing of the located value, or the processing in absence of locating a value, is shown by Blocks 525, 530, 535, 540, 545, and 550, and is analogous to Blocks 360, 365, 370, 375, 380, and 385, respectively, of FIG. 3.

In an optional aspect of the present invention, the translation key references which have been built into a main XML document may be used to automatically increase the likelihood that translated content is available (and thus provide a better translated document result). That is, with reference to the example, the main document 100 of FIG. 1A may be scanned to locate all of the embedded translation key references (or the table which represents a result of performing this processing according to FIG. 4 may be used), and the located references can be compared to each of the supplemental documents (or, alternatively, to selected ones thereof). If a particular supplemental document has no markup language element which provides content for a translation key reference, then an exception report may be generated, and/or a prompt message may be issued to a content translator, and so forth.

As has been demonstrated, the present invention defines techniques for efficiently and reliably translating document content with use of structured documents. The disclosed techniques may be applied for translating textual elements, and may also be adapted for use with non-textual information, as has been described. Using the globalization model disclosed herein, which separates translated content in the supplemental documents from translation-sensitive resources identified in the main document, a content translation expert can operate efficiently to provide the translated content, without being hindered by content which is not pertinent to his or her task, and a content designer can more easily focus on the task at hand using a resource-neutral document format from which translatable resources have been removed.

U.S. Pat. No. 6,151,624, which is titled "Navigating Network Resources Based On Metadata", describes a client/server technique for naming and locating network resources in a language-independent way. It involves a registry of well-known metadata tags which describe Web pages, such as a title, description, language designation, or geographical location. The metadata is defined by an administrator of the server that stores the Web pages. Multilingual access to network resources is enabled by defining multiple "real name" values for a resource, each in a different language. (A "real name" is the name of a network resource expressed in conventional syntax of a natural language and is required to be unique across the Internet.) This network registry service approach contrasts to the flexible technique disclosed herein, where each content designer may select arbitrary attribute values for identifying and resolving translatable content using a set of supplemental structured documents.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method for translating content of structured documents, comprising steps of:
    obtaining a first structured document in which a translation-triggering keywords is specified as an attribute name on one or more translation-sensitive tags, each of the translation-sensitive tags corresponding to a translation-sensitive resource, wherein each occurrence of the attribute name has an attribute value that is associated therewith to represent the corresponding resource;
    obtaining one or more second structured documents in which each of the attribute values is specified as a translation-result tag name that has a corresponding translation-result tag value;
    programmatically locating each occurrence of the translation-triggering keyword, and the attribute value associated therewith, in the first structured document;
    using each of the programmatically-located attribute values to programmatically search a selected one of the second structured documents until finding the programmatically-located attributed value as one of the translation-result tag names and its corresponding translation-result tag value; and
    programmatically creating a translated version of the first structured document wherein each of the programmatically-located translation-triggering keywords and its associated attribute value are programmatically removed from each of the one or more translation-sensitive tags, and wherein the programmatically-found translation-result tag value corresponding to the programmatically-removed associated attribute value is programmatically appended as a tag value of the translation-sensitive tag.

2. The method according to claim 1, wherein the first structured document identifies translation-sensitive resources and the second structured documents contain translated content for the resources.

3. The method according to claim 2, wherein each of the second structured documents contains language-specifie versions of the translated content.

4. The method according to claim 1, wherein the programmatically-created translated version is created dynamically while rendering the first structured document to a user.

5. The method according to claim 1, wherein the programmatically-created translated version is crated dynamically while rendering the first structured document to a consuming component.

6. The method according to claim 1, wherein at least one programmatically-found translation-result tag value is a text string.

7. The method according to claim 1, wherein at least one programmatically-found translation-result tag value identifies a graphic image.

8. The method according to claim 1, further comprising the step of selecting a target translation language, and wherein the selected one of the second structured documents is that one which provides translation-result tag values for use with the selected language.

9. The method according to claim 8, wherein the step of selecting the target translation language further comprises the step of programmatically determining a locale, and wherein the selected one of the second structured documents in one which provides translation-result tag values for use with the determined locale.

10. A system for translating content of structured documents, comprising:
    a first structured document in which a translation-triggering keyword is specified as an attribute frame on one or more translation-sensitive tags, each of the translation-sensitive tags corresponding to a translation-sensitive resource, wherein each occurrence of the attribute name has an attribute value that is associated therewith to represent the corresponding resource;
    one or more second structured documents in which one or more of the attribute values is specified as translation-result tag name that has a corresponding translation result tag value;
    means for programmatically locating each occurrence of the translation-triggering keyword, and the attribute value associated therewith, in the first structured document;
    means for using each of the programmatically-located attributed values to programmatically search a selected one of the second structured documents until finding the programmatically-located attribute value as one of the translation-result tag names and its corresponding translation-result tag value; and
    means for programmatically creating a translated version of the first structured document wherein each of the programmatically-located translation-triggering keywords and its associated attribute value are programmatically removed from each of the one or more translation-sensitive tags, and wherein the programmatically-found translation-result tag value corresponding to the programmatically-removed associated attribute value is programmatically appended as a tag value of the translation-sensitive tag.

11. The system according to claim 10, wherein the first structured document specifies languages in which the translated version can be created, and wherein the one or more second structured documents correspond to the specified languages.

12. A system for translating structured documents, comprising:
   a tag evaluator that evaluates tags of a first structured document to determine whether a translation-triggering keyword is specified as an attribute name thereon;
   an attribute locator that locates, responsive to the tag evaluator determining that the translation-triggering keyword is specified as an attribute name, an attribute value corresponding thereto;
   a translation-result finder that scans translation-result tags of a second structured document until finding one of the scanned translation-result tags having, as its tag name, the attribute value located by the attribute locator, wherein the found translation-result tag further comprises a translation-result tag value; and
   a tag translator that copies the evaluated tags of the first structured document to an output structured document unchanged if the tag evaluator determines that the translation-triggering keyword is not specified as an attribute name thereon, and that otherwise copies the evaluated tags to the output structured document after appending, as a translation-result tag value of the copied tags, the translation-result tag value found by the translation-result tag finder.

13. The system according to claim 12, wherein the tag translator also removes the specified translation-result keyword ad the corresponding attribute value located by the attribute locator when appending the translation-result tag value.

14. The system according to claim 12, wherein at least one of the translation-result tag values identifies an icon.

15. A computer-implemented method of translating structured documents, comprising steps of:
   scanning tags of a first structured document to determine whether a translation-triggering keyword is specified as an attribute name on any of the scanned tags; and
   if a particular tag scanned by the scanning step is determined not to have the translation-triggering keyword specified thereon, copying the particular tag to an output structured document unchanged and otherwise, performing step of:
      extracting, from the particular tag, an attribute value that corresponds to the translation-triggering keyword;
      matching the extracted attribute value against tag names of a second structured document, until finding a match;
      upon finding the match, extracting a tag value that corresponds to the matched-against tag name; and
      copying the particular tag to the output structured document after appending the extracted tag value as a new tag value of the particular tag.

16. The method according to claim 15, wherein the step of copying the particular tag to the output structured document after appending the extracted tag value also removes, from the particular tag, the specified translation-triggering keyword and its corresponding attribute value.

17. The method according to claim 15, wherein the translation-triggering keyword is dynamically determined by inspecting the first structured document.

18. The method according to claim 15, wherein the scanning step scanning the tags to determine whether any of a plurality of translation-triggering keywords are specified as an attribute name.

19. A computer program product for translating structured documents, the computer program product embodied on one or more computer-readable media and comprising computer-readable program code means for performing steps of:
   scanning tags of a first structured document to determine whether a translation-triggering keyword is specified as an attribute name on any of the scanned tags; and
   if a particular tag scanned by the scanning step is determined not to have the translation-triggering keyword specified therein, copying the particular tag to an output structured document unchanged and otherwise, performing steps of:
      extracting, from the particular tag, an attribute value that corresponds to the translation-triggering keyword;
      matching the extracted attribute value against tag names of a second structured document, until finding a match;
      upon finding the match, extracting a tag value that corresponds to the matched-against tag name; and
      copying the particular tag to the output structured document after appending the extracted tag value as a new tag value of the particular tag.

20. The method according to claim 1, wherein the translation-triggering keyword is a predetermined keyword.

21. The computer program product according to claim 19, wherein at least one of the extracted tag values is a file name.

22. The computer program product according to claim 19, wherein at least one of the extracted tag values is a uniform resource locator.

23. A system for translating structured documents, comprising:
   a tag evaluator that evaluates tags of a first structured document to determine whether a translation-triggering keyword is specified as an attribute name thereon;
   an attribute locator that locates, responsive to the tag evaluator determining that the translation-triggering keyword is specified as an attribute name, an attribute value corresponding thereto; and
   an attribute recorded that records, in a repository, each of the attribute values located by the attribute locator, such that a subsequent translation of the first structured document can be carried out using:
      a translation-result finder that scans translation-result tags of a second structured document until finding one of the scanned translation-result tags having, as its tag name, one of the attribute values recorded by the attribute recorder, wherein the found translation-result tag further comprises a translation-result tag value, and then associates that found translation-result tag value with the recorded attribute value; and
      a tag copier that copies that tags of the first structured document to an output structured document unchanged if the repository has no attribute value matching any of the attribute values recorded in the repository, and that otherwise copies the tags to the output structured document after appending, as a tag value of the copied tags, the translation-result tag value associated with the recorded attribute value specified therein in the first structured document.

* * * * *

UNITED STATES PATENT AND TRADEMARK OFFICE
CERTIFICATE OF CORRECTION

PATENT NO.         : 6,934,908 B2                                        Page 1 of 1
APPLICATION NO. : 09/981195
DATED              : August 23, 2005
INVENTOR(S)        : Fox et al.

It is certified that error appears in the above-identified patent and that said Letters Patent is hereby corrected as shown below:

<u>Column 6,</u>
Line 32, change "1D)=can be" to -- 1D)–can be --.

<u>Column 11,</u>
Line 46, change "keywords is" to -- keyword is --.
Line 62, change "attributed value" to -- attribute value --.

<u>Column 12,</u>
Line 13, change "language-specifie" to -- language-specific --.
Line 20, change "is crated" to -- is created --.
Line 58, change "attributed values" to -- attribute values --.

<u>Column 13,</u>
Line 34, change "word ad" to -- word and --.

<u>Column 14,</u>
Line 15, change "specified therein," to -- specified thereon, --.
Line 57, change "copies that" to -- copies the --.

Signed and Sealed this

Twenty-seventh Day of June, 2006

JON W. DUDAS
*Director of the United States Patent and Trademark Office*